United States Patent [19]

Suzuki et al.

[11] 4,220,045
[45] Sep. 2, 1980

[54] MASS FLOW MEASURING APPARATUS

[75] Inventors: Suzuo Suzuki, Yokosuka; Hiroyuki Maruoka, Yokohama; Hatsuo Nagaishi, Yokosuka; Yuji Matsubara, Yokohama, all of Japan

[73] Assignee: Nissan Motor Company, Limited, Yokohama, Japan

[21] Appl. No.: 963,714

[22] Filed: Nov. 27, 1978

Related U.S. Application Data

[62] Division of Ser. No. 865,185, Dec. 28, 1977, abandoned.

[30] Foreign Application Priority Data

Jan. 10, 1977 [JP] Japan ............................. 52/1792

[51] Int. Cl.² .................... G01F 1/56; G01F 1/76
[52] U.S. Cl. ............................................. 73/861.05
[58] Field of Search ................. 73/194 F, 194 E, 118

[56] References Cited

U.S. PATENT DOCUMENTS

| | | | |
|---|---|---|---|
| 3,732,854 | 5/1973 | Murtin | 73/194 F X |
| 3,839,910 | 10/1974 | Fitch | 73/194 F |
| 3,996,795 | 12/1976 | Servassier | 73/194 F |

OTHER PUBLICATIONS

W. C. Cooley et al., "Determination of Air Velocity by Ion Transit-Time Measurements," Rev. Sci. Instr., vol. 23, No. 4, pp. 51 & 53, Apr. 1952.

Primary Examiner—Charles A. Ruehl
Attorney, Agent, or Firm—Schwartz, Jeffery, Schwaab, Mack, Blumenthal & Koch

[57] ABSTRACT

Mass flow measuring apparatus includes ionizing electrodes and an ion collecting electrode located downstream of the ionizing electrodes where the ionizing electrodes are biased with a high DC voltage produced in response to ignition pulses of an internal combustion engine. The high voltage is derived from a tap of the secondary winding of the ignition coil of the ignition circuit. The ions are allowed to migrate at the same speed with the mass fluid flow an are collected by the collecting electrode. The transit time of the ions over the distance between the ionizing electrodes and the collecting electrode is measured. The period of the high DC voltage applied across the ionizing electrodes may be controlled in accordance with the magnitude of the load of the engine and/or the transit time of the ions.

4 Claims, 11 Drawing Figures

MASS FLOW MEASURING APPARATUS

This is a division, of application Ser. No. 865,185, filed Dec. 28, 1977, now abandoned.

FIELD OF THE INVENTION

The present invention relates to mass flow measuring apparatus which measure the drift of ionized fluid mass and more particularly to a mass flow measuring apparatus which measures the transit time of an ionized fluid mass migrating with the surrounding fluid mass over a predetermined distance between two points in the path of fluid flow.

BACKGROUND OF THE INVENTION

The reduction of noxious exhaust emissions from an internal combustion engine is achieved when the fuel supply is controlled by a feedback control signal derived from an exhaust gas sensor. In designing such feedback control system accurate measurement of fuel quantity supplied to the engine is required. Specifically, the mass flow measuring device must be capable of responding to the instantaneous variation of fluid flow. Conventional mass flow meters are not satisfactory for such purposes.

U.S. Pat. No. 3,470,741 discloses a mass flow meter which includes an ionizing means disposed in the path of fluid flow and a pair of opposed ion collecting electrodes spaced from the ionizing means transversely of the direction of fluid flow. With no fluid flow the ions would travel a median point of the collecting electrode. In the presence of fluid flow, the ions would displace from the median point and there is a difference between the charges collected by the respective electrodes, which difference is detected by a comparator.

SUMMARY OF THE INVENTION

The present invention contemplates to utilize the longitudinal migration of ions produced in the path of fluid flow at the same speed with the fluid stream. A high DC voltage produced in the ignition circuit of an internal combustion engine may be utilized for ionizing the fluid or may be utilized for triggering a high voltage pulse generator which generates a train of high voltage pulses utilized for same purpose. The migration of the ions over a predetermined distance between first and second points displaced downstream of the first point is detected to measure the transit time of the ions over that known distance. Because of the longitudinal displacement of ions that is utilized, the mass flow meter of the invention is particularly suitable for high rate flow measurement and is capable of responding to rapid variations of the flow rate. The frequency of the high voltage pulses exerted across the ionizing electrodes may be controlled in accordance with the magnitude of the load of the engine and/or the transit time of the ions to maintain a suitable period of pulses.

Therefore, it is a primary object of the present invention to provide a mass flow measuring apparatus for an internal combustion engine whose responsiveness to mass flow rate variations is greatly improved.

Another object of the present invention is to provide such an apparatus the durablity of which is high since no movable is included.

A further object of the present invention is to provide such an apparatus in which the fluid rate is measured with extreamely low flow resistance.

A still further object of the present invention is to provide such an apparatus the size of which may be appreciably small so that it is convenient to mount the apparatus on a vehicle.

BRIEF DESCRIPTION OF THE DRAWINGS

The advantages and features of the present invention will become more readily apparent from the following detailed description of the preferred embodiment taken in conjunction with the accompanying drawings in which.

DESCRIPTION OF THE PREFERRED EMBODIMENTS

Figure 1:
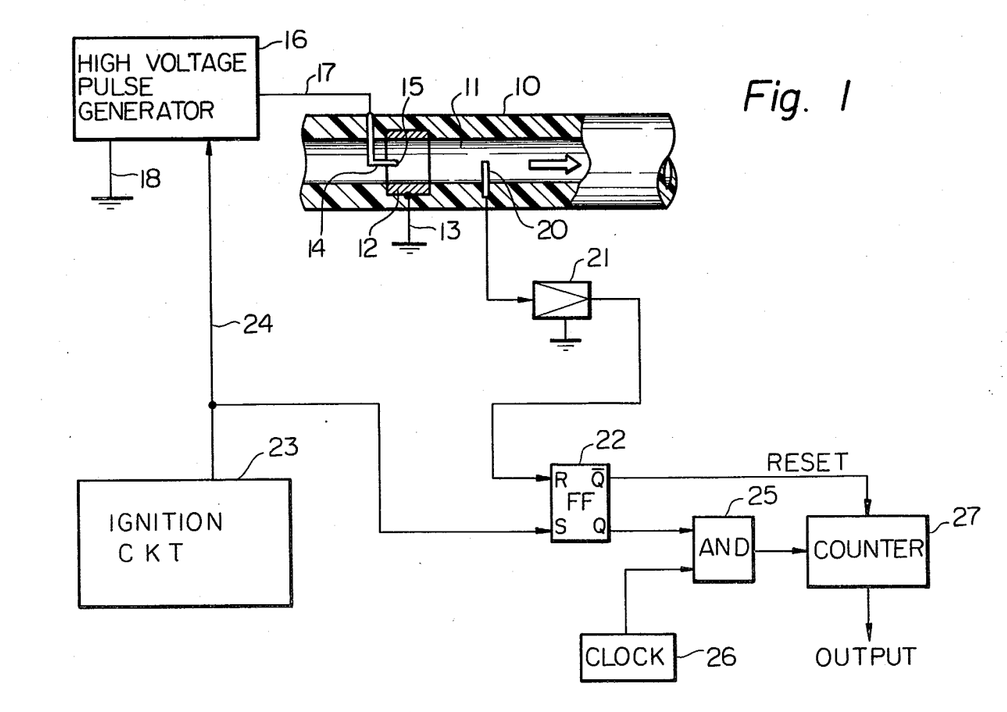
FIG. 1 is the first embodiment of the present invention.

A mass flow apparatus of a first embodiment is shown in FIG. 1 in which fluid is directed to pass through a passage 11 of a hollow cylindrical structure or pipe 10 which is constructed of an electrically nonconductive material. Ionizing means are provided which is formed by two electrodes: a ring or cylindrically hollow outer electrode 12 and a cylindrical rod or inner electrode 14 having a reduced diameter portion 15. The ring electrode 12 is embedded into the inner wall of the conduit 10 and connected electrically to a first terminal of a high voltage pulse generator 16 or ground by conductors 13 and 18. The cylindrical rod 14 is disposed concentrically with the center axis of the ring electrode 12 and connected electrically to the second terminal or output of the pulse generator 16 by conductor 17. An ion collecting electrode 20 is mounted in the cylindrical structure 10 downstream from the ionizing electrodes 12, 14 and connected electrically to a sense amplifier 21 whose output is connected to the reset terminal of a flip-flop 22. This flip-flop is triggered into a set condition by an ignition pulse as a trigger pulse from an ignition circuit 23 which also supplies the ignition pulse as a trigger signal to the pulse generator 16 through a conductor 24.

An AND gate 25 is connected to the Q output of the flip-flop 22 to pass clock pulses from clock source 26 to a binary counter 27 which is reset by the Q output of flip-flop 22. The counter 27 provides digital output representing the transit time of the flow in the passage 11 over the distance between the ionizing electrode 15 and the collecting electrode 20. This digital output is applied to a flow rate indicating circuit (not shown) where the input signal is used to arithmetrically divide the known distance between electrodes 15 and 20 to compute an instantaneous value of the flow rate.

The amplitude of the pulse from the pulse generator 16 and the shape and size of the inner electrode 14 are so determined as to establish a corona discharge in the fluid passage 11 so that a portion of the fluid is ionized to produce a cloud of oppositely charged ions. The pulse from generator 16 is of negative polarity because it is found to be advantageous for effecting ionization of the fluid such as gasoline or the like, as compared with the use of positive polarity pulses. As a result, the positively charged ions are rapidly attracted by the negatively biased inner electrode 14, while the negatively charged ions migrate in the form of a space charge or cloud of ions with the fluid flow down the passage 11 at the same speed until they are collected by the collecting electrode 20, which is sensed by the amplifier 21. On the other hand, the flip-flop 22 is switched to a first binary state in response to the trigger pulse and AND gate 25 is thus enabled to pass clock pulses to the binary counter 27. Upon the detection of the negatively charged ions by the collecting electrode 20, the flip-flop 22 is switched to a second binary state to reset the counter 27.

It is understood therefore that in response to each of the trigger pulses from the ignition circuit 23, a cloud of negatively charged ions is produced in the passage 11 and migrates at the same speed as the speed of fluid flow in the passage 11 from the point defined by the ionizing electrode 15 to the point defined by the collecting electrode 20. During the migration of the cloud of ions the counter 27 is activated to produce an output representative of the transit time of the ions over the known distance between the two defined points. Since the cloud of ions migrates at the same speed as the fluid flow, the digital output from the counter 27 is a measure of the instantaneous value of the mass flow rate.

Figure 2:
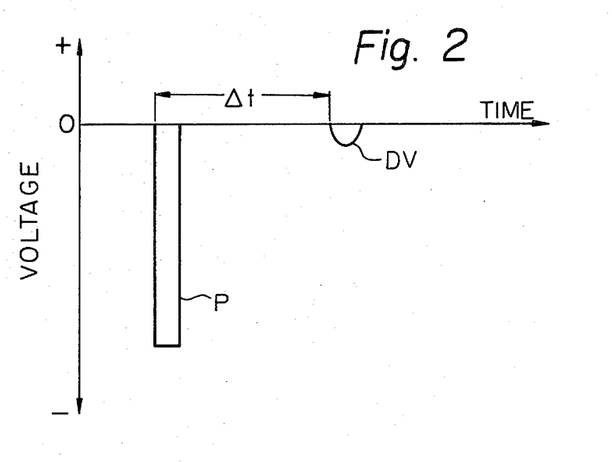
FIG. 2 shows the relationship between the exerted pulse across the ionizing electrodes and the detected signal in time.

FIG. 2 illustrates the relationship between the pulse "P" fed across the ionizing electrodes 12, 14 and the detected signal DV in time. Δt shows the migration time of ions. The migration time Δt is detected by the counter 27 shown in FIG. 1 as described hereinbefore.

Figure 3:
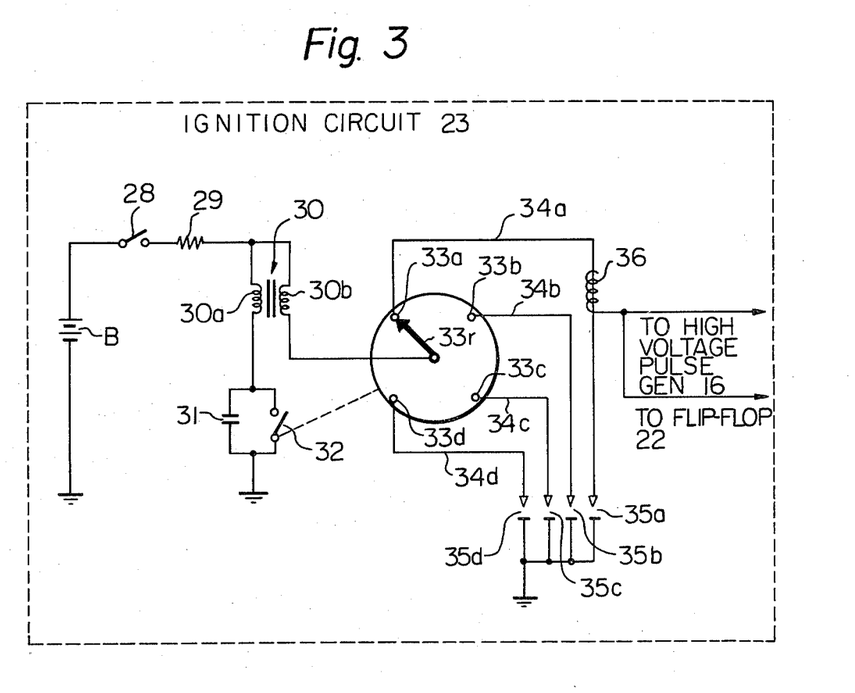
FIG. 3 shows an ignition circuit included in the first embodiment.

Reference is now made to FIG. 3 which shows an ignition circuit 23 utilized in the present invention. The ignition circuit per se is a conventional type including primary and secondary circuits. A positive terminal of a battery B is connected via an ignition switch 28 and a resistor 29 to respective terminals of primary and secondary windings 30a, 30b of an ignition coil 30 while the negative terminal of the battery B is connected to ground. The other terminal of the primary winding 30a is connected via a breaker point 32 to ground. A capacitor 31 for preventing a spark of the breaker point 32 is connected in parallel with the breaker point 32. The other terminal of the secondary winding 30b is connected to a rotor 33r of a distributor 33. Since the distributor 33 shown in FIG. 2 is for an internal combustion engine with four cylinders, the distributor 33 has four stationary electrodes 33a, 33b, 33c and 33d. These stationary electrodes are respectively connected via high-tension lines 34a, 34b, 34c and 34d to ignition plugs 35a, 35b, 35c and 35d.

A high voltage is induced across the secondary winding 30b when the contact breaker 32 closes instantaneously and the high voltage is distributed to respective ignition plugs 35a, 35b, 35c and 35d. Above mentioned construction and operation of the ignition circuit is the same as a conventional type except that a pick-up coil 36 is provided on the high-tension line 34a where one terminal of the pick-up coil 36 is connected to the high voltage pulse generator 16. The pick-up coil 36 is electrically insulated from the high-tension line 34a but an electric voltage is induced across the pick-up coil 36 when a high voltage is fed to the ignition plug 35a via the high-tension line 34a.

The high voltage pulse generator 16 shown in FIG. 1 may be omitted if the output of the ignition circuit 23, viz. an ignition pulse is directly utilized. Hence, second to fifth embodiments will be shown hereinafter through FIG. 4 to FIG. 7.

Figure 4:
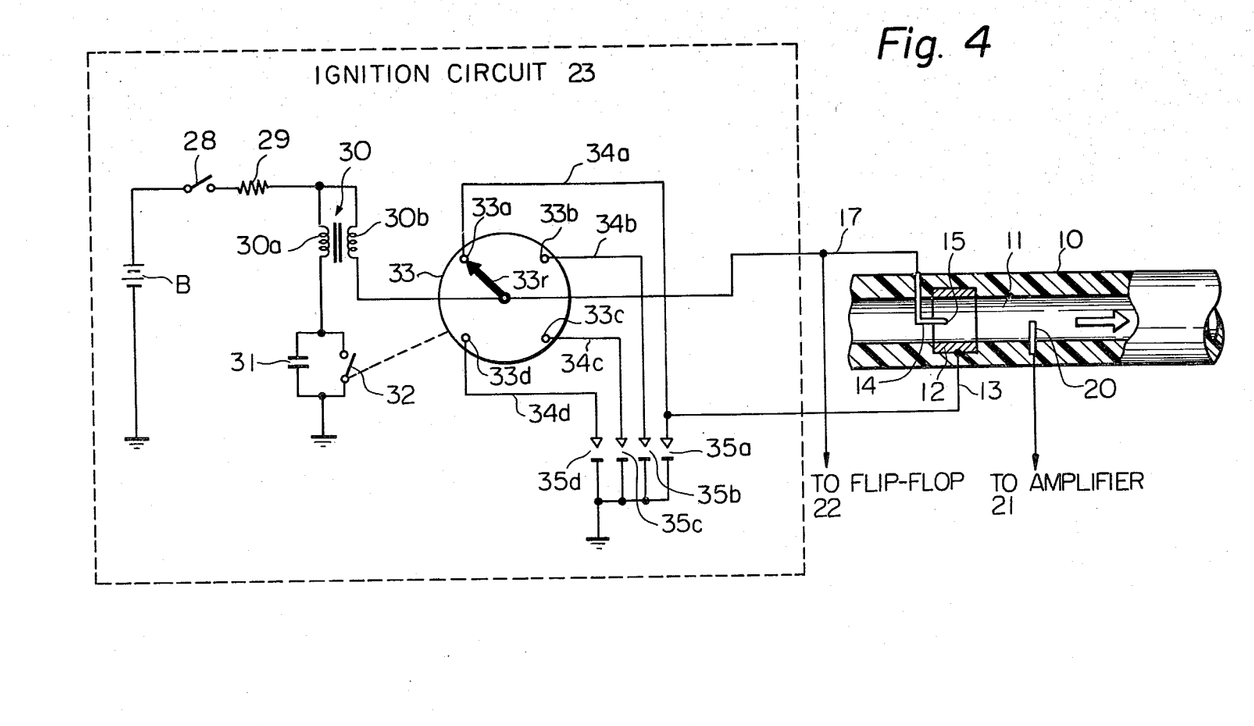
FIG. 4 to FIG. 7 show the second to fifth embodiments of the present invention; in which a high voltage output of an ignition circuit is utilized for ionizing the fluid.

Reference is now made to FIG. 4 which shows a second embodiment. The ignition circuit 23 shown in FIG. 4 is the same as in the first embodiment shown in FIG. 2 except that the rotor 33r is connected to the inner electrode 14 while the high-tension line 34a is connected to the cylindrical electrode 12. A discharging gap (about 0.7 mm) is provided between the rotor 33r and respective stationary electrodes 33a–33d. Therefore when the high voltage is distributed to the high-tension line 34a, the high voltage is also fed across the electrodes 12, 14. In this embodiment the cylindrical electrode 12 may be connected to ground instead of connecting to the high-tension line 34a.

Figure 5:
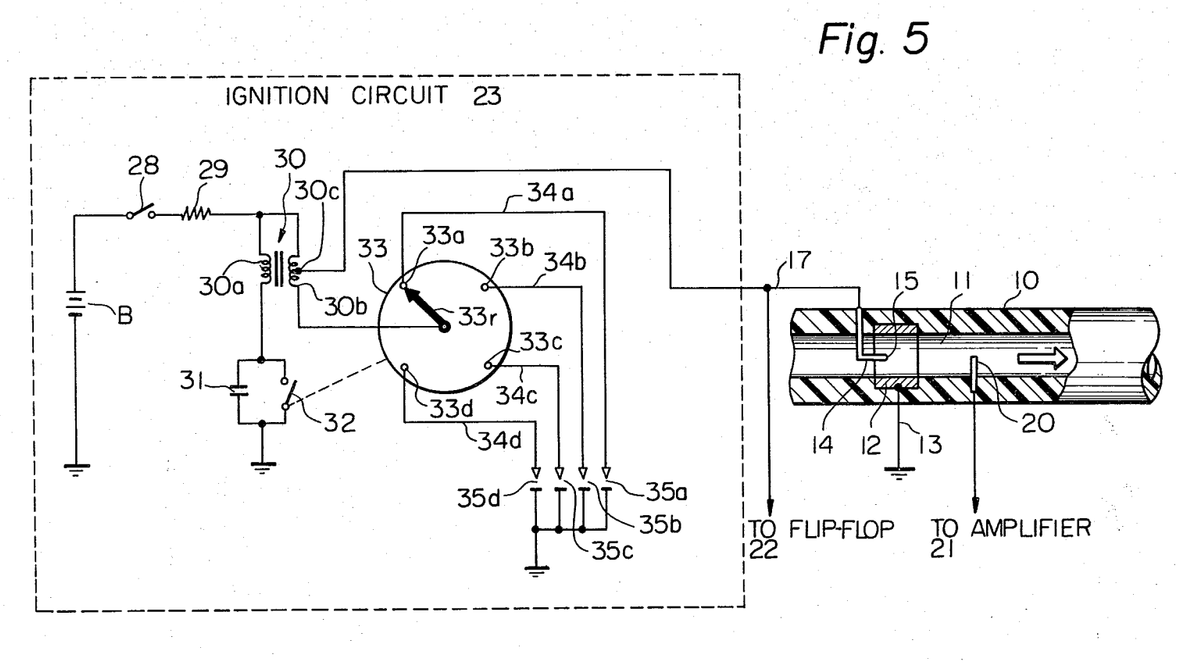

Reference is now made to FIG. 5 which shows a third embodiment. The ignition circuit 23 is the same as the first embodiment except that the inner electrode 14 is connected to a tap 30c provided in the secondary winding 30b of the ignition coil 30. A high voltage is also induced through the tap 30c and fed across the electrodes 12, 14 since the outer electrode 12 is connected to ground via a conductor 13.

Since the high voltage applied across the first and second electrodes 15 and 12 is derived from the tap 30c of the secondary winding 30b of the ignition coil 30, voltage fluctuation due to repetition of contact in the distributor 33 is reduced at the tap 30c by means of the inductance of the coil between the tap 30c and the terminal, connected to the rotor 33r of the distributor 33, of the secondary winding 30b.

Figure 6:
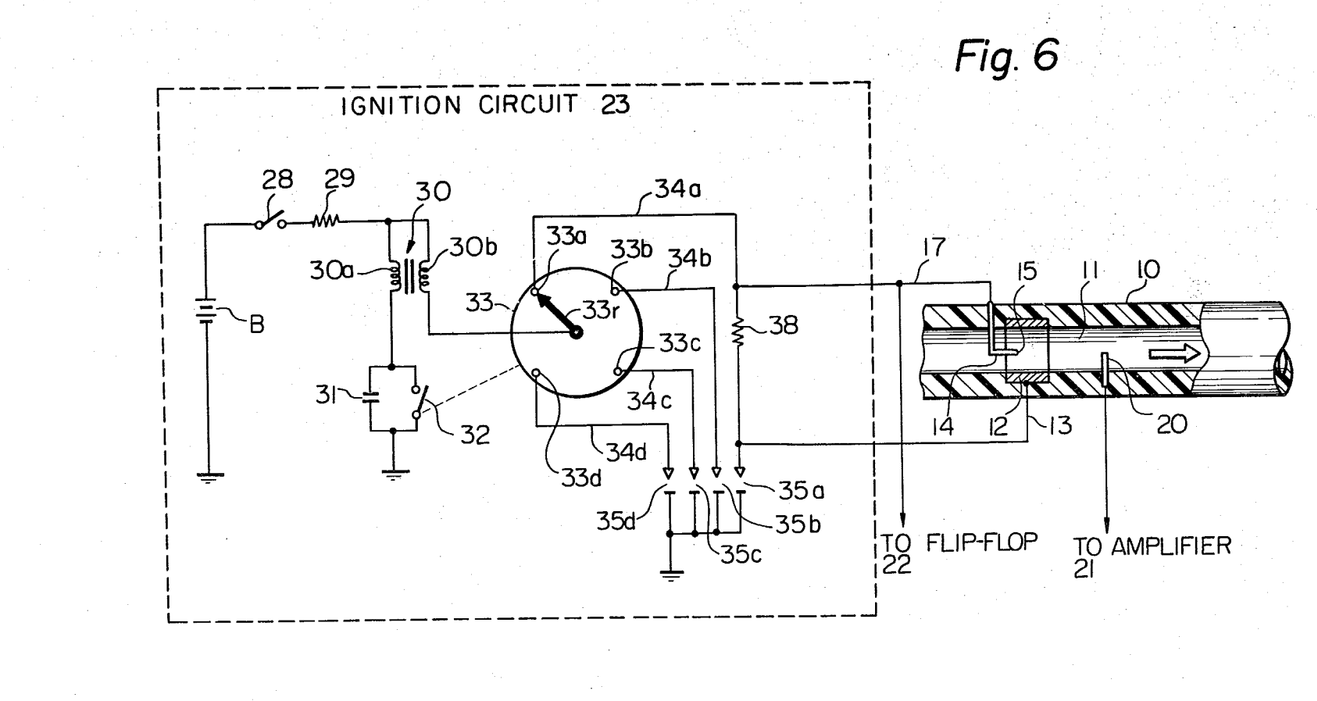

Reference is now made to FIG. 6 which shows a fourth embodiment. The ignition circuit 23 is the same in construction as the first embodiment except that a resistor 38 is interposed in the high-tension line 34a. The outer and inner electrodes 12, 14 are respectively connected via conductors 13, 17 across the resistor 38 so that a high voltage generated across the resistor 38 is exerted across the ionizing electrodes 12, 14.

Figure 7:
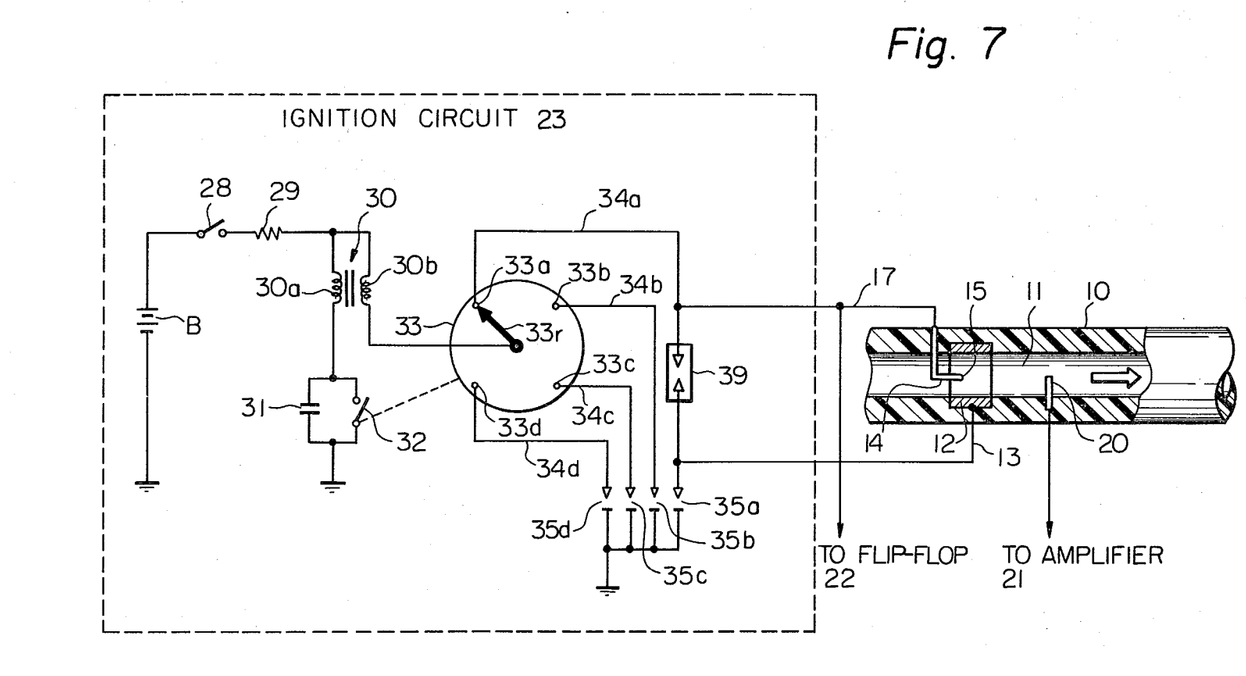

Reference is now made to FIG. 7 which shows a fifth embodiment. The ignition circuit is the same in construction as the first embodiment except that a discharge tube 39 is interposed in the high-tension line 34a. The outer and inner electrodes are respectively connected across the discharge tube 39. The discharge tube 39 may be substituted with a discharge gap (not shown). With this arrangement a high voltage applied across the discharge tube 39 is instantaneously fed across the outer and inner electrodes 12, 14.

In above described five embodiments shown in FIG. 2 to FIG. 7 the period of the pulses exerted across the outer and inner electrodes 12, 14 is preferably greater than a migration time of the ions to prevent a malapropos detection of ions. Therefore the distance between the ionizing electrode 15 and the collecting electrode 20 is determined through consideration described hereinbelow.

The quantity of flow $Q'$ per t seconds, which is the migration time of fuel, is given by the following equation where L (mm) is the distance between the ionizing electrode 15 and the collecting electrode 20, d (mm) is the diameter of the passage 11.

$$Q' = L \cdot \pi (\tfrac{1}{2}d)^2 \qquad (1)$$

The migration time t (ms) of the fuel is given by rearrangement of the equation (1) wherein Q (l/h) is the quantity of flow per an hour.

$$t = 0.9\pi \frac{Ld^2}{Q} \qquad (2)$$

The period $t'$ (ms) of the ignition of a specific cylinder of the internal combustion engine has following relationship with the engine rotational speed N (rmp).

$$\frac{t'}{1000} \times \frac{N}{60} \times \tfrac{1}{2} = 1 \qquad (3)$$

From the above equation the following equation is obtained.

$$t' = \frac{120000}{N} \qquad (3)$$

Assuming the maximum engine rotational speed as 6000 rpm the minimum period $t'_{min}$ is as follows.

$$t'_{min} = \frac{120000}{6000} = 20 \qquad (4)$$

Since the migration time t should be less than the minimum period $t'_{min}$ of engine rotation, the following mathmatical relationship is derived by the equations (2) and (4).

$$0.9 \pi \frac{Ld^2}{Q} < 20 \qquad (5)$$

When the minimum fuel flow rate is determined at 0.7 (l/h), the following relationship is obtained.

$$Ld^2 < 4.95 \qquad (6)$$

By the equation (6) the distance "L" and the diameter "d" are determined. For instance when the distance L is 5 mm, the diameter d should be less than 0.99 mm and when the distance is 3 mm, the inner diameter d should be less than 1.28 mm to satisfy the relationship, i.e. $t < t'$ through all engine rotational speeds.

In the embodiments described hereinabove, a train of ignition pulses of a specific cylinder of an internal combustion engine is utilized for producing the high voltage. The period of pulses applied applied to the ionizing electrode 12, 14 may be controlled not to be shorter than the migration time of ions. Even though the rotational speed of the crankshaft of the engine is constant, the flow rate of the fuel fed to the engine is apt to vary depending on the variation of the load thereof. Therefore, the period of pulses applied across the ionizing electrodes may be preferably controlled in accordance with the magnitude of the load of the engine. The control of the period of the pulses in the above-mentioned manner has following advantages:

(1) There is no need to limit the distance between the ionizing electrode 15 and the collecting electrode 20 as well as the diameter of the passage 11. Therefore, the diameter of the passage 11 can be made so large that the flow resistance of the passage against the fluid can be appreciably reduced and thus the generation of the noise can be prevented.

(2) The period of pulses may be selected at will without depending on the period of the ignition pulses of a specific cylinder of the engine.

(3) The period of pulses can be shortened when the flow rate of the fuel is high and thus a high response of detection is derived.

Figure 8:
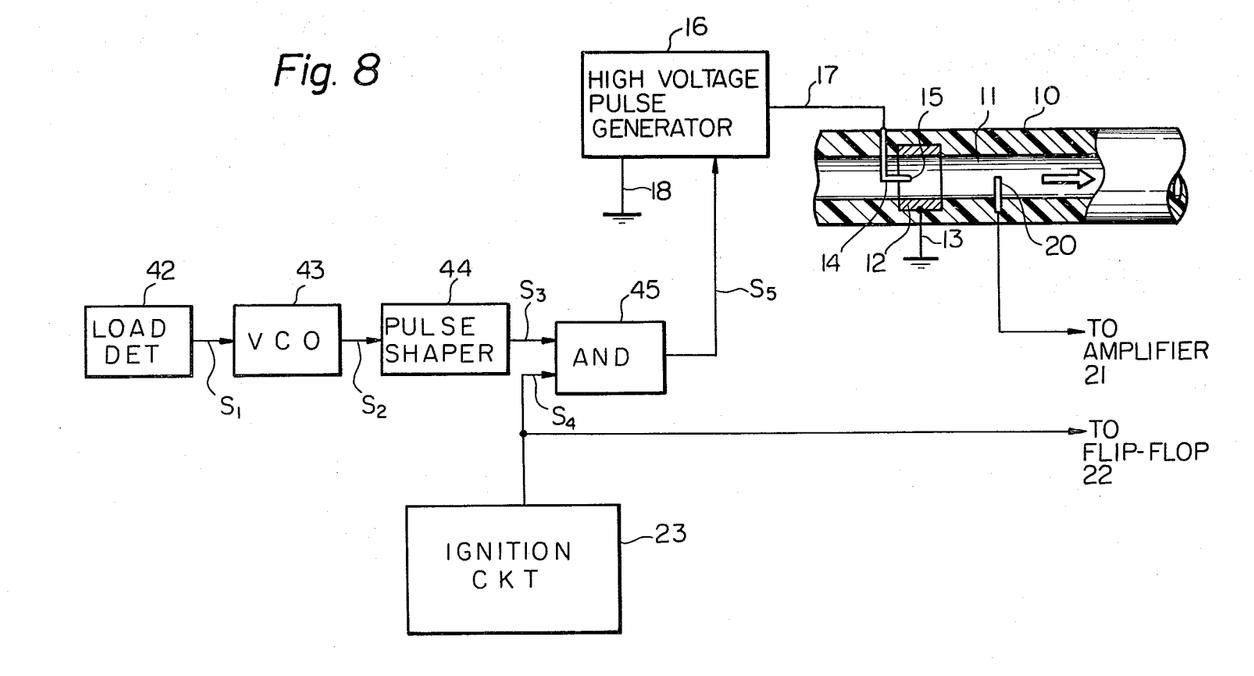
FIG. 8 is the sixth embodiment of the present invention in which the period of pulses is controlled by a first control circuit.

Hence, reference is now made to FIG. 8 which shows an embodiment of the apparatus for measuring the mass flow of the fluid in which the period of pulse exerted across the ionizing electrodes 12, 14 varies depending on the variation of the load of the internal combustion engine. A load detector 42 which detects the magnitude of the load of the engine is connected to a VCO 43 (voltage controlled oscillator). The output of the VCO 43 is connected to a pulse shaper 44. The output of the pulse shaper 44 is connected to an input of an AND gate 45 while the output of the ignition circuit 23 is connected to the other input of the AND gate 45. The output of the AND gate 45 is connected to the high voltage pulse generator 16. The other arrangement of the circuit shown in FIG. 8 is the same as in FIG. 1. Corresponding elements are designated by like numerals as in FIG. 1.

The load detector 42 detects the instantaneous load of the internal combustion engine and thus produces an output signal $S_1$ representative of the magnitude of the load. The VCO produces a signal $S_2$ the frequency of which varies in accordance with the magnitude of the output signal $S_1$ of the load detector 42. The pulse shaper 44 produces a train of pulses $S_3$ the frequency of which is the same as that of the signal $S_2$. The pulse width of each pulses $S_3$ is arranged to be constant. The train of pulses $S_3$ is applied to an AND gate 45 while the output of the ignition circuit 23, i.e. the ignition pulses, is also applied to the other input terminal of the AND gate 45.

Figure 9:
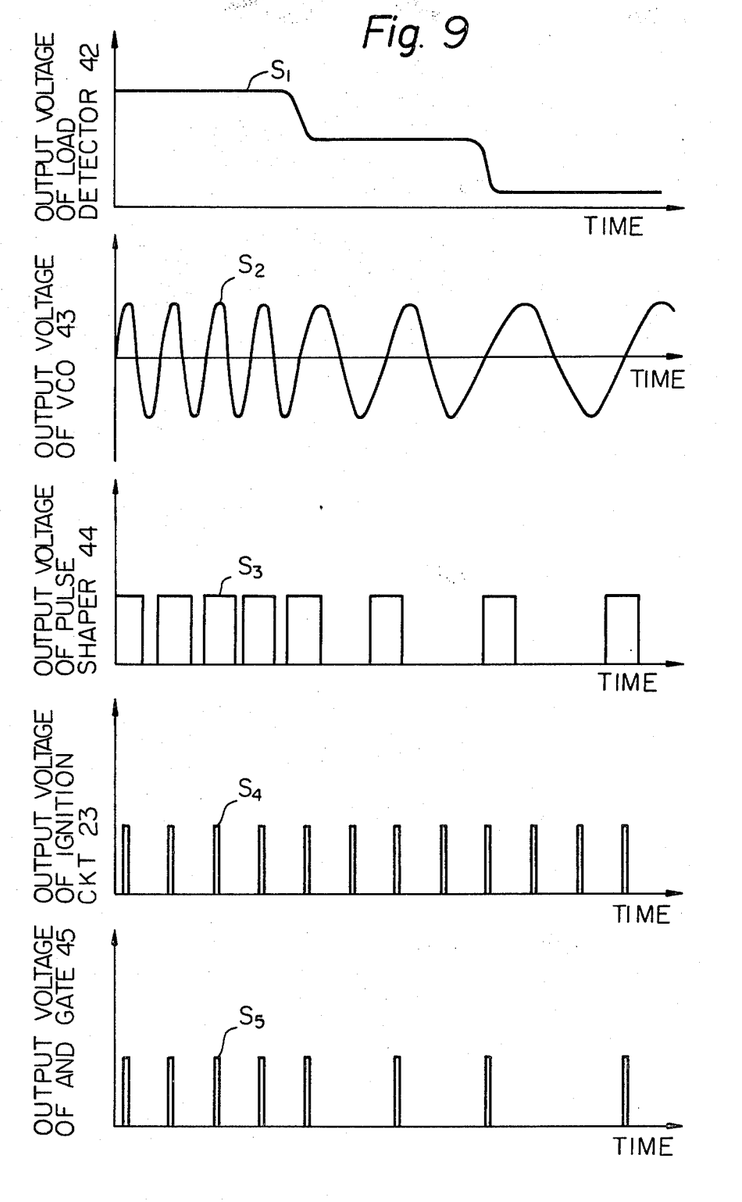
FIG. 9 shows waveforms of signals obtained in the circuit of the sixth embodiment shown in FIG. 8.

FIG. 9 illustrate above-mentioned signals $S_1$ to $S_5$. As shown in FIG. 9, the signal $S_1$ assumes a relatively high level when the load detector 42 detects a great load of the engine and thus the VCO 43 produces the signal $S_2$ which has a relatively high frequency. The signal $S_2$ is then fed to the pulse shaper 44 which may includes a monostable vibrator (not shown) for producing a train of pulses the pulse width of which is constant. It is understood that as the voltage of the signal $S_1$ decreases, the frequency of the signal $S_2$ lowers and thus the period of the pulses $S_3$ lengthens. Since both of the train of pulses $S_3$ and the ignition pulses $S_4$ from the ignition circuit 23 are supplied to respective input of the AND gate, the AND gate 45 produces its output signal $S_5$ only when the input signals coincide as shown in FIG. 9. The high voltage pulse generator 16 is arranged to feed a train of high voltage pulses to the inner and the outer electrodes 12, 14 in response to the output signal $S_5$ of the AND gate 45. This means that some ignition pulses $S_4$ produced by the ignition circuit 23 are thinned out in response to the magnitude of the load of the engine.

With this arrangement, the period of the pulses applied across the inner and other electrodes 12, 14 shortens when the load of the engine becomes large, i.e. when the amount of the fluid passing through the passage for a unit time is great. On the contrary, the period lengthens when the load of the engine becomes small, i.e. when the fluid flow rate passing therethrough is low. It is to be noted that the migration time of the ions from the ionizing electrode 15 to the collecting electrode 20 is short when the fuel flow rate is high while the migration time of same is long when the fuel flow rate is low.

As previously discussed, a successive pulse or pulses is preferably prevented from applying across the ionzing electrodes 12, 14 until ions already produced by same reach the collecting electrode 20. Therefore, a successive ignition pulse or pulses produced by the ignition circuit 23 should not cause to generate the high voltage pulse which will be applied across the ionizing electrodes 12, 14.

Figure 10:
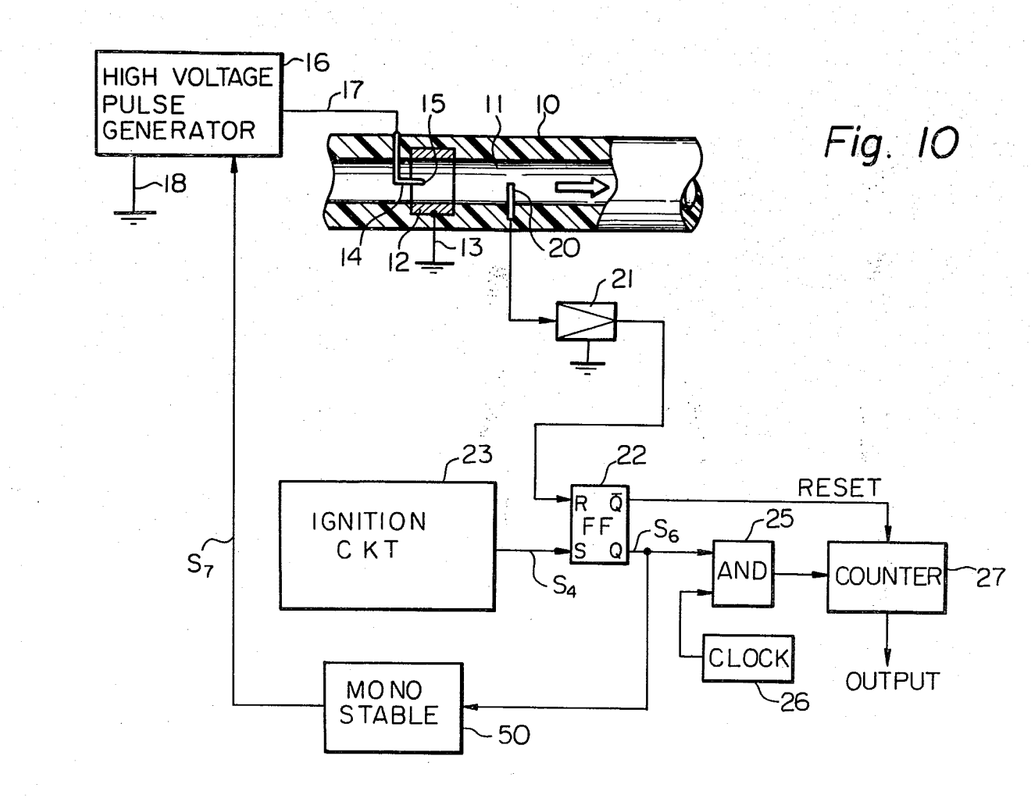
FIG. 10 is the seventh embodiment of the present invention in which the period of pulses is controlled by a second control circuit.

Hence, FIG. 10 illustrates an embodiment of the apparatus for measuring the mass flow of fluid in which the period of high voltage pulses applied across the ionizing electrodes 12, 14 varies depending of the migration time of the ions. The construction of the circuit shown in FIG. 10 is the same as in FIG. 1 except that the output of the ignition circuit 23 is not connected to the high voltage pulse generator 16 and further a monostable multivibrator 50 is provided between an output of the flip-flop circuit 22 and the high voltage pulse generator 16. Corresponding elements are designated by the same numerals as in FIG. 1.

Figure 11:
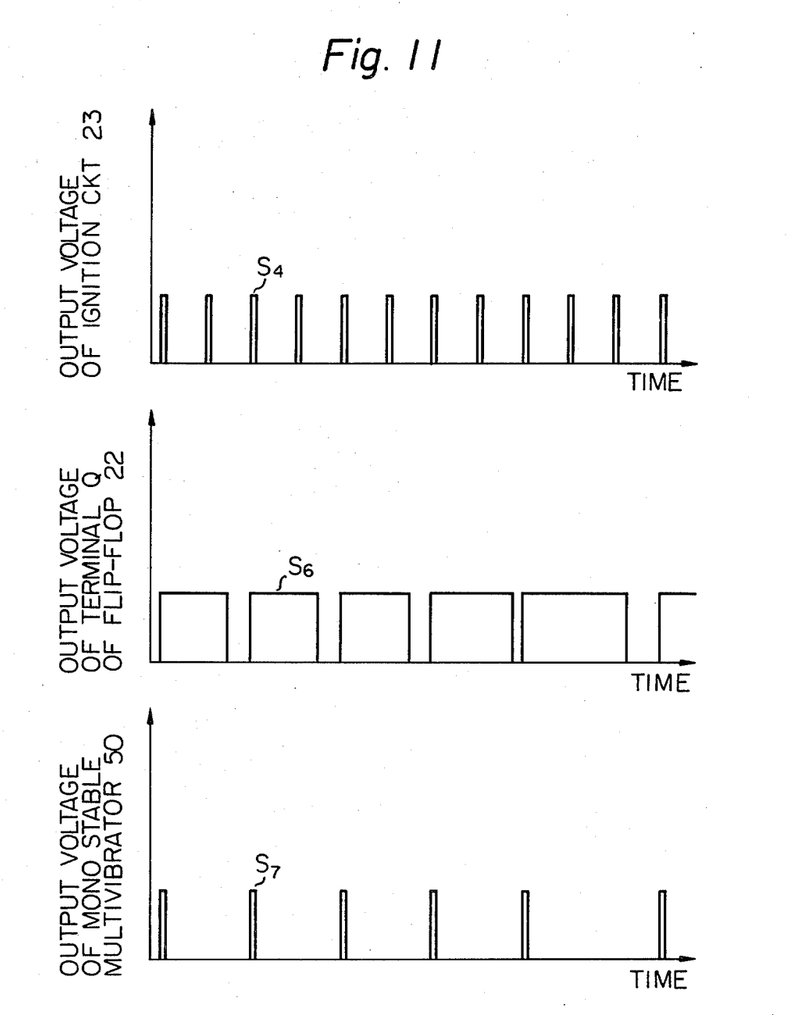
FIG. 11 shows waveforms of signals obtained in the circuit of the seventh embodiment shown in FIG. 10.

FIG. 11 illustrates signals $S_4$, $S_5$ and $S_6$ produced by the ignition circuit 23, flip-flop circuit 22 and the monostable multivibrator 50. The output signal $S_4$ of the ignition circuit 23 is fed to the set terminal S of the flip-flop circuit 22 and thus the output at the output terminal Q turns high, which is referred to as the signal $S_6$. The output signal $S_6$ is then supplied to the monostable multivibrator 50 as well as to the AND gate 25. The monostable multivabrator 50 is arranged to produce the pulse signal $S_7$ in response to the leading edge of the signal $S_6$. The pulse width of the pulse signal $S_7$ is defined by constants of the multivibrator 50 and thus the pulse width is constant independing of the frequency thereof. The high voltage pulse generator 16 produces a high voltage pulse in response to the output signal $S_7$ of the multivibrator 50. The high voltage pulse is exerted across the ionizing electrodes 12, 14 and thus ions are produced in the passage 11. After a migration time of the ions, the ions are collected by the collecting electrode 20 and thus a pulse is applied via the amplifier 21 to the reset terminal R of the flip-flop circuit 22. When the pulse is fed to the reset terminal R, the output at the output terminal Q of the flip-flop circuit 22 turns low. The output at the terminal Q turns high upon presence of successive pulse fed from the ignition circuit 23. The same operations are repeated periodically. It will be understood with this arrangement, when the migration time of the ions is longer than the period of the ignition pulses $S_4$, the successive ignition pulse of pulses do not cause to generate the high voltage pulses. FIG. 11 shows the above-mentioned state in which some ignition pulses $S_4$ are thinned out.

What is claimed is:

1. Apparatus for measuring the mass flow of fluids passing therethrough for an internal combustion engine equipped with an ignition circuit for igniting the air-fuel mixture in the cylinders of the internal combustion engine, said ignition circuit including a secondary circuit, an ignition coil having a secondary winding and a tap on said winding, and a common terminal connected to ground, said apparatus, comprising:

(a) first and second electrodes disposed in the path of fluid flow for ionizing the fluid to generate an electrically distinguishable fluid mass from the surrounding mass of fluid, said electrically distinguishable fluid mass migrating with said surrounding fluid between first and second predetermined points along the path of fluid flow, said first and second electrodes being disposed at said first predetermined point, said second predetermined point being located downstream of said first predetermined point;

(b) means for applying a high DC voltage in response to a train of ignition pulses generated in said ignition circuit across said first and second electrodes for biasing said first and second electrodes at opposite potentials at intervals, said means including first and second conductors connecting the secondary circuit of said ignition circuit to said first and second electrodes, said first conductor being connected to said tap of the secondary winding of the ignition coil, said second conductor being connected between said second electrode and ground to which the common terminal of said ignition circuit is connected;

(c) means for detecting the presence of said electrically distinguishable fluid mass at said second predetermined point and providing an output indicative of said presence; and (d) means, responsive to said output, for determining a transit time of said electrically distinguishable fluid mass over the distance between said first and second predetermined points.

2. The mass flow measuring apparatus according to claim 1, wherein said means for detecting comprises:

an ion collecting electrode located in said path of fluid flow at said second predetermined point; and a sense amplifier having an input and an output, said input connected to said ion collecting electrode and said output indicative of the presence of said electrically distinguisable mass at said ion collecting electrode.

3. The mass flow apparatus according to claim 1 or 2, wherein said means for applying includes means for providing a trigger pulse and said means for determining said transit time comprises means, responsive to said trigger pulse and said output, for measuring a time difference between said trigger pulse and said output.

4. The mass flow apparatus according to claim 3, wherein said measuring means comprises:

a flip-flop having set and reset inputs and a flip-flop output, said set input responsive to said trigger pulse and said reset input responsive to said sense amplifier output;

means, responsive to said flip-flop output, for providing a plurality of clock pulses; and means for counting said clock pulses during said time difference between said trigger pulse and said sense amplifier output, said counted clock pulses indicative of said transit time.

* * * * *